United States Patent [19]

Loos

[11] 4,064,585

[45] Dec. 27, 1977

[54] THREAD CUTTING MACHINE

[75] Inventor: Wilhelm Loos, Plettenberg, Germany

[73] Assignee: Loos & Schmidt Wilhelm Loos GmbH, Plettenberg, Germany

[21] Appl. No.: 730,520

[22] Filed: Oct. 7, 1976

[30] Foreign Application Priority Data

Oct. 11, 1975 Germany .............................. 2545623

[51] Int. Cl.² ........................ B23G 1/20; B23G 11/00
[52] U.S. Cl. ........................ 10/130 WH; 10/139 WH; 408/7; 408/12; 408/63; 408/69
[58] Field of Search ...... 10/129 R, 129 WH, 129 WJ, 10/130 WH, 136 R, 139 R, 139 WH, 139 WJ; 408/6, 7, 11, 12, 63, 69

[56] References Cited

U.S. PATENT DOCUMENTS

| 2,249,758 | 7/1941 | Goldberg | 408/63 |
| 2,373,619 | 10/1945 | Vajda | 408/7 |
| 2,869,154 | 1/1959 | Williams | 408/7 |
| 2,952,170 | 9/1960 | Hansen et al. | 10/129 R |
| 3,838,934 | 10/1974 | Petroff | 408/12 |

FOREIGN PATENT DOCUMENTS

| 1,010,435 | 11/1965 | United Kingdom | 10/139 WJ |
| 676,896 | 8/1952 | United Kingdom | 10/129 WH |
| 857,774 | 1/1961 | United Kingdom | 10/139 WH |
| 868,803 | 5/1961 | United Kingdom | 10/139 WH |

*Primary Examiner*—E. M. Combs
*Attorney, Agent, or Firm*—Spencer & Kaye

[57] ABSTRACT

An automatic thread cutting machine for nuts and similar mass-produced parts where the nuts or the like are taken from a magazine and moved through a feed trough into a guide where they are held secured against rotation and are then pushed by means of a pusher over a rotating thread cutter from where they are subsequently removed while the pusher is returned to its starting position. The machine is provided with an actuating cylinder which is capable of being charged with a pressure medium and which has a piston rod that is provided at its free end with a plunger serving as the pusher. A clock pulse controlled switch valve arrangement is disposed in the pressure medium line leading to the actuating cylinder, and the machine is electrically protected by a safety device which is influenced by the position of the piston rod, the safety device being rendered operative in dependence on the position of the piston rod.

15 Claims, 8 Drawing Figures

THREAD CUTTING MACHINE

BACKGROUND OF THE INVENTION

The present invention relates to an automatic thread cutting machine for nuts and similar mass-produced pieces where the nuts or the like travel from a magazine through a feed trough into a guide where they are held secure against rotation and are pushed by means of a pusher over a rotating thread cutter from which they are removed via the rearwardly bent end while the pusher is in the process of being retracted.

Machines of this type are known in which the blank nuts are pushed onto the thread cutter by means of a pusher, the movement of the pusher being controlled by a cam whose advance is adapted to the respective pitch of the thread or increases constantly. The displacement force in this case is produced either by weights or by spring elements having various unfavorable characteristics.

It is also known to advance the blank nuts between three rotating worms, the arrangement being such that the pitch and rotational speed of the worms correspond to the desired thread pitch.

Conventional automatic thread cutters, which inherently are relatively complicated pieces of equipment, require extensive change gears so as to enable the machine to be used for cutting threads having different pitches.

It is, therefore, the object of the present invention to provide a simplified and improved automatic thread cutter of the above described type, i.e., a thread cutter having relatively uncomplicated structure which is readily adaptable to cut different threads.

It is another object of the present invention to provide an automatic thread cutter in which malfunctions in the supply of nuts and during cutting are better detectable than was previously possible, thus avoiding damage to the machine.

It is a further object of the invention to provide a machine capable of producing threaded nuts of higher quality than was heretofore possible.

SUMMARY OF THE INVENTION

With the above objects in view, the present invention resides in an automatic thread cutting machine for nuts and similar mass-produced parts where the nuts or the like are taken from a magazine and moved through a feed trough into a guide where they are held secured against rotation and are then pushed by means of a pusher over a rotating thread cutter from where they are subsequently removed while the pusher is returned to its starting position. The machine is provided with an actuating cylinder which is capable of being charged with a pressure medium and which has a piston rod that is provided at its free end with a plunger serving as the pusher. A clock pulse controlled switch valve arrangement is disposed in the pressure medium line leading to the actuating cylinder, and the machine is electrically protected by a safety device which is influenced by the position of the piston rod, the safety device being rendered operative in dependence on the position of the piston rod.

DETAILED DESCRIPTION OF THE PREFERRED EMBODIMENTS

All embodiments have in common two, preferably pneumatically operated actuating cylinders 3, 3' which advance blank nuts 1 from a magazine (not shown) through feeder troughs 2 to rotating thread cutters (not shown) between rotationally secured mounts for the blank nuts 1 during cutting of the threads, each of the cylinders being provided at the free end portions of their respective piston rods 4 facing the thread cutter with an exchangeably mounted tubular pusher 5.

The actuating cylinders 3, 3' are double-acting cylinders so that both spaces of the cylinder 7 on either side of piston 6 function as displacement chambers 8, 9, respectively, and can be charged with a fluid medium under pressure, such as compressed air.

The piston rod 4 protrudes from cylinder 7 also at the side which faces away from pusher 5 and is mounted so as to be axially displaceable by means of a longitudinally extending ball bearing mount 10. The piston rod gaskets are shown at 11.

A conduit 13 leads from an air compressor 12 to the displacement chambers 8 and a conduit 14 leads to the displacement chambers 9 of the actuating cylinders 3, 3'. Both conduits are provided with adjustable pressure reducing valves 15, 16. The pressure reducing valve 15 maintains the air pressure constant at about 6 atmospheres gauge, while the valve 16 reduces the pressure to about 2 atmospheres gauge. Downstream of the valve 15, conduit 13 opens into a T-shaped connector pipe to which are connected two three-way solenoid valves 17 and 17' which serve to control the flow in the pipes. These flow control valves open the line to the series-connected choke valves 18 when an electrical voltage is applied while in the other switching position, i.e., when the electrical current supply is interrupted, they open the line to the solenoid valves 17, 17' which connect the conduits leading from the choke valves 18 with conduits leading to the atmosphere.

Choke valves 18 are designed so that they adjustably reduce the air pressure in the flow direction toward the displacement chambers 8 while in the opposite direction of flow, they open up the full cross section of the line.

Following valve 16, then is a compressed air reservoir 19 disposed in conduit 14, the reservoir having a volume equal to about four times that of the volume of one of displacement chambers 8, 9.

The solenoid valves 17, 17' are electrically connected to an electric clock pulse generating relay 20 whose clock pulse can be selectively changed and which alternatingly acts on solenoid valves 17, 17', respectively.

At the end portion facing away from pusher 5 of the piston rod 4 of each operating cylinder 3, 3' there is a displaceably fastened mount 21, the latter being provided with two switching fingers 22 and 23. Switching finger 22 cooperates with an electrical contactless control switch 24 which is attached to the machine frame and is connected to an adjustable electrical time-delay relay 25. The latter is designed so that after a preselectable period, a pulse is emitted which switches off the entire machine unless the control switch 24 has emitted a pulse to this time-delay relay 25 within the preselected period of time. This occurs if the piston rod 4 does not reach the displacement path required to place a blank nut 1 onto the thread cutter, as might happen with blank nuts having no holes, or too narrow holes, or off-center holes, or obliquely positioned or otherwise incorrectly introduced blank nuts 1, or if nuts are jammed in the guide.

The switching finger 23 is adjustable in length and cooperates with a control switch 26 which is connected to an electrically adjustable time-delay relay 27 and to an electrical storage relay 28. This control has the effect that if no blank nut 1 is present in front of pusher 5, the latter will not be held back by the blank nut which is on the thread cutter at the beginning of the cutting process, so that piston rod 4 would be advanced farther than during normal blank nut introduction and would actuate control switch 26 via switching finger 23. This control switch 26 emits a switching pulse via time-delay relay 27 to the storage relay 28 in that the number of successive switching pulses emitted by the control switch 26 is counted and stored.

If, for example, the preselected number of switching pulses, e.g., five, within the time preselected by time-delay relay 27 is exceeded due to the complete absence of blank nuts in the feeder trough 2, the machine is also cut off. If, however, the preselected number of switching pulses is not received by control switch 26 during the time preselected by time-delay relay 27, time-delay relay 27 will erase the previously fed-in pulses from the storage relay 28 without the machine being cut off.

As can be seen in the drawings, the above-described safety devices which are provided for the actuating cylinders 3, 3' and which cut off the machine during malfunctions, have in common the time-delay relays 25 and 27 as well as the storage relay 28.

Conduit 14 connects displacement chambers 9 of the two actuating cylinders 3, 3'. Moreover, a further choke valve 18 is arranged directly ahead of the displacement chambers and the conduit coming from compressed air reservoir 19 opens into the connecting line between the above-mentioned choke valves 18.

Figure 1:
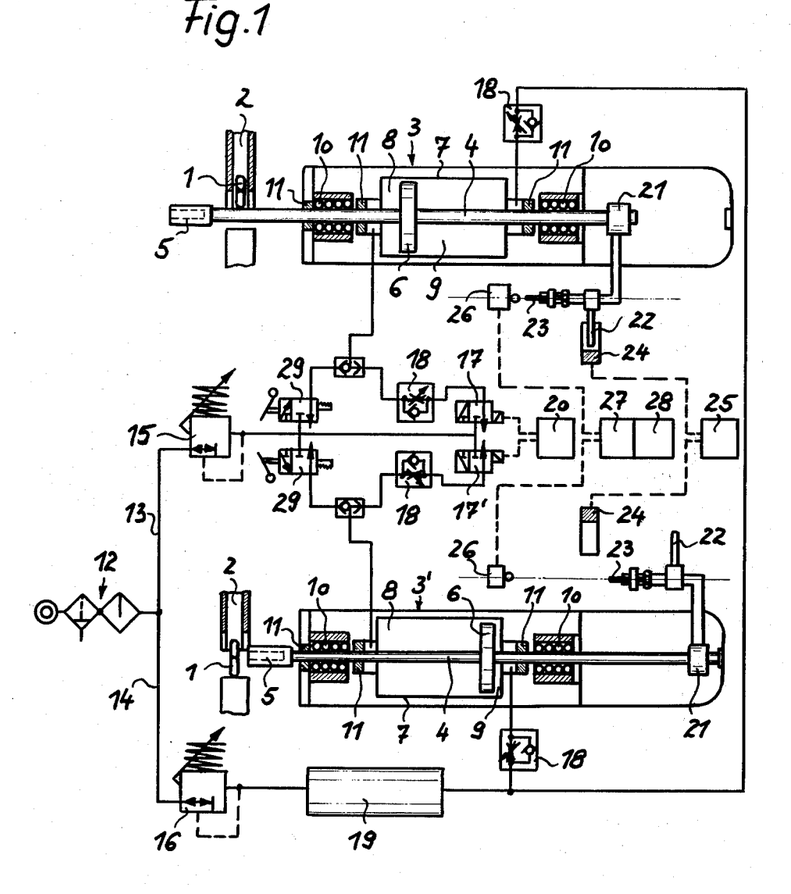
FIG. 1 is a schematic illustration of one embodiment of the device for transporting the blank nuts in an automatic thread cutter.

Furthermore, manually actuated switch valves 29 are provided, as shown in FIG. 1, these valves being connected in parallel with solenoid valves 17, 17'.

Figure 2:
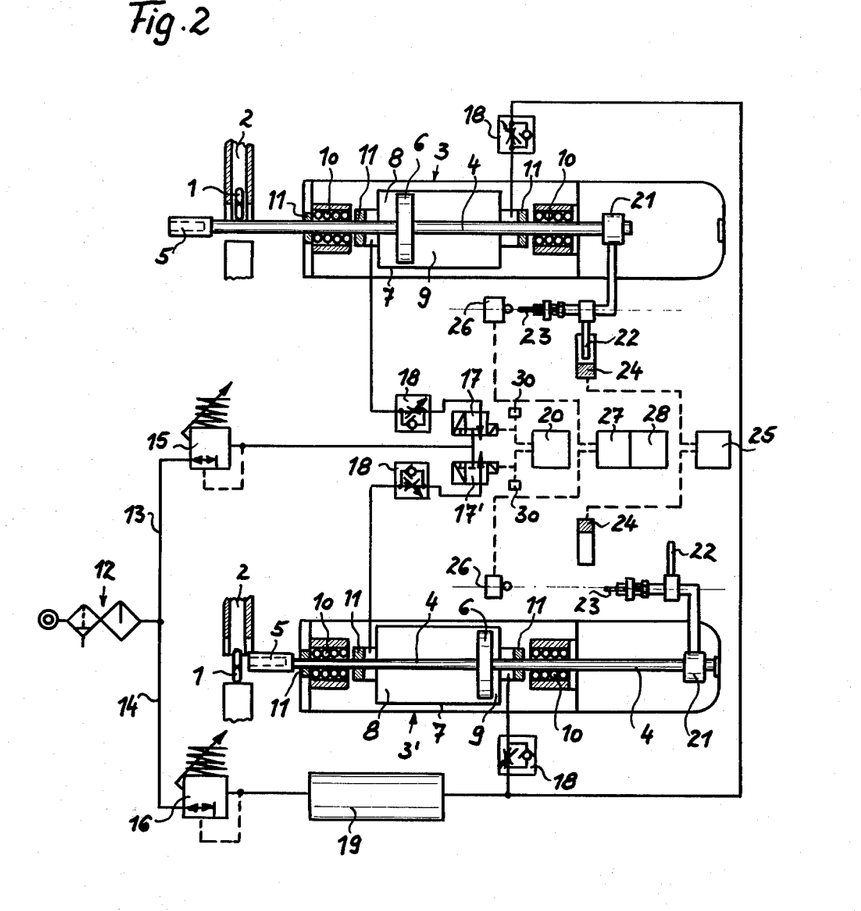
FIGS. 2 and 3 show further embodiments of the transporting device.

In the embodiment shown in FIG. 2, which is essentially similar to that of FIG. 1, as is the embodiment of FIG. 3, the valves 29 are replaced by electrical, selectively manually actuatable switches 30, as will be described in detail below.

Figure 3:
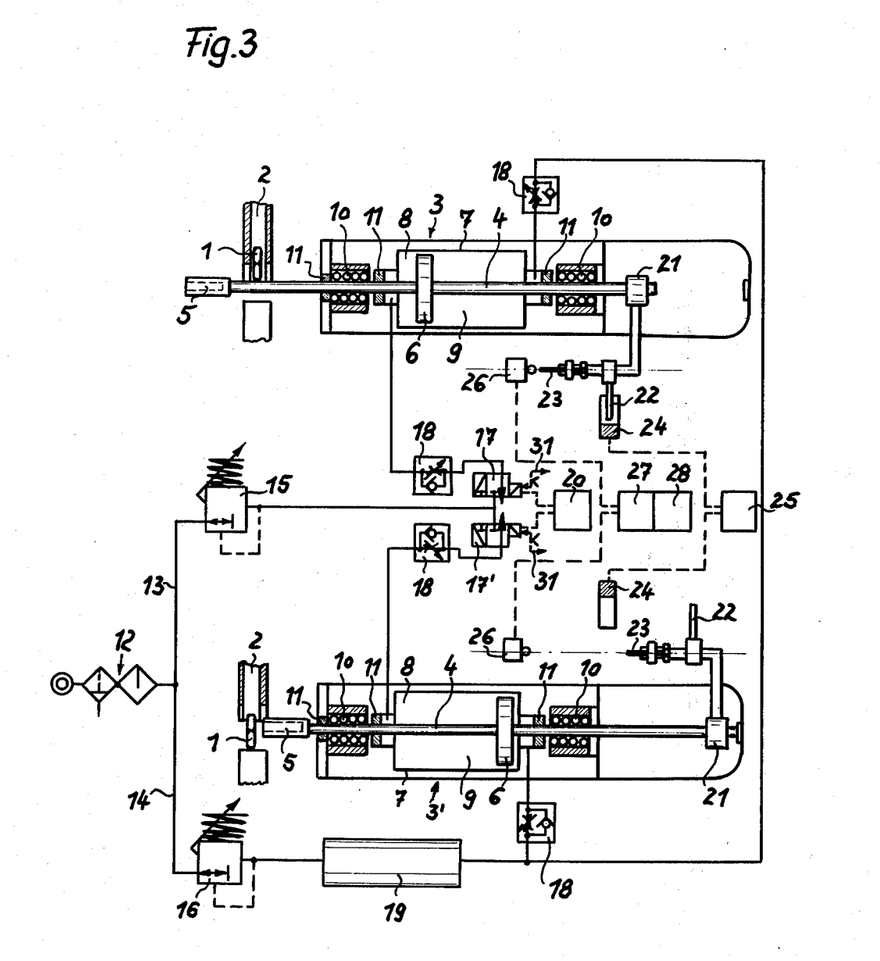

The embodiment of FIG. 3 differs from those described above in that one switch valve 29 (FIG. 1) or one electrical switch 30 (FIG. 2) associated with each solenoid valve 17, 17' is replaced by a mechanical switch 31 by means of which the solenoid valve 17 can be selectively switched manually.

Figure 4:
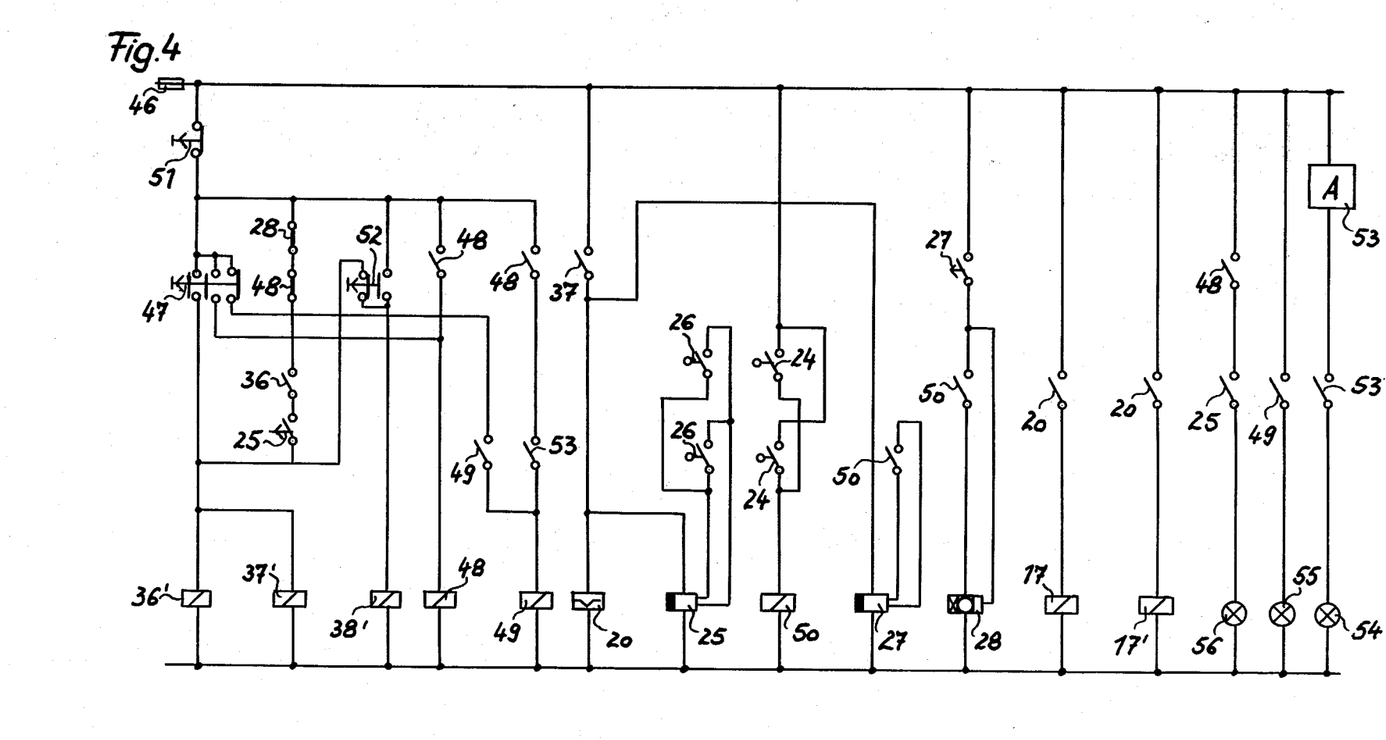
FIGS. 4 and 5 are circuit diagrams for the control circuits.
Figure 5:
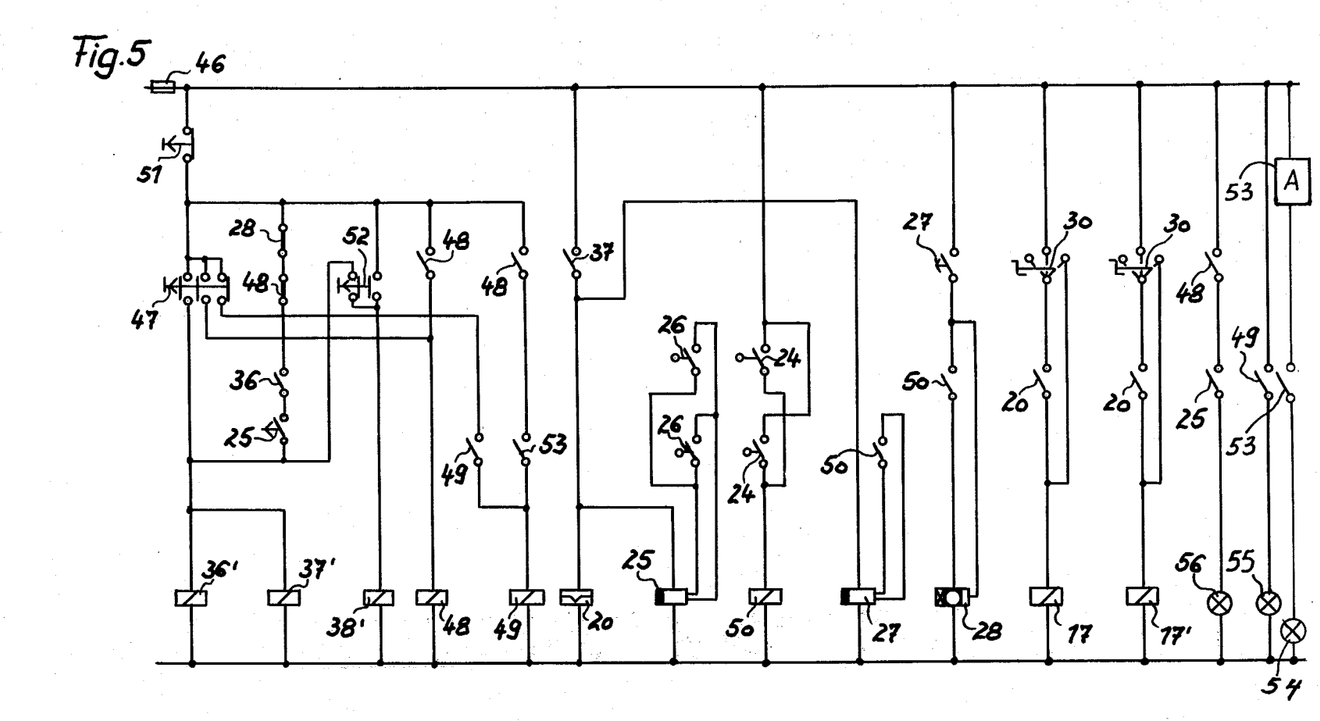
Figure 6:
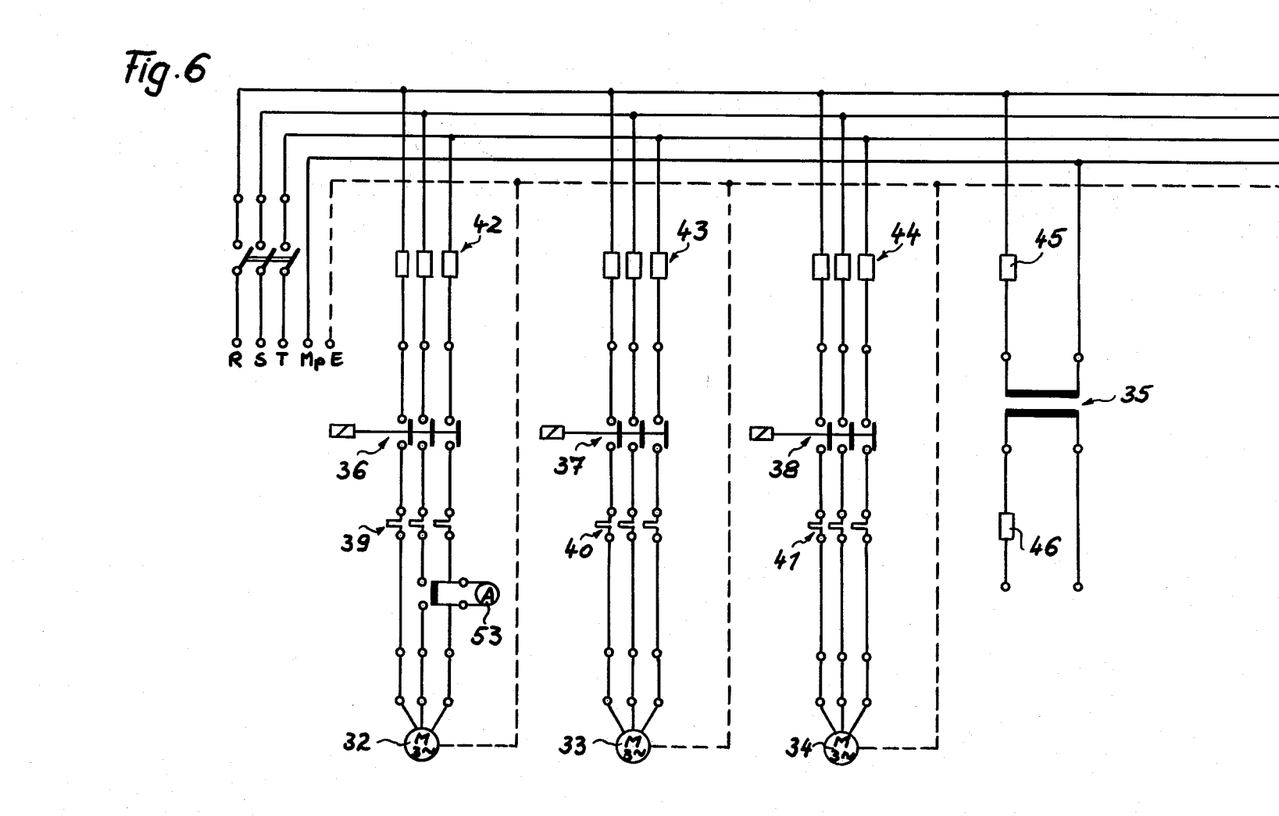
FIG. 6 is a circuit diagram for the main circuit.

The circuit diagrams of FIGS. 4, 5 and 6 explain the operation of the thread cutting machine described in connection with FIGS. 1 to 3. The entire electrical system is connected to a three-phase main power supply via terminals R, S, T, Mp and E. A multipole master switch is provided for switching the entire electrical system on and off. A three-phase motor 32 is connected to the power supply to drive the rotating thread cutter, as is a three-phase motor 33 for driving a vibrator provided in the magazine (not shown) for the blank nuts, as well as a single-phase transformer 35 to feed the control circuit. A three-phase motor 34 is connected to a pump (not shown) which is to supply the cutter with lubrication oil or the like.

Electromagnetic switching relays 36, 37, 38 as well as electrothermal circuit breakers 39, 40, 41 and fuses 42, 43, 44 are provided in all lines leading to motors 32, 33 and 34. Melting-type fuses 45 and 46 are also provided in the transformer phase at the primary as well as at the secondary sides.

To operate the thread cutter according to the invention, the main switch is first closed and then starter button 47, associated with the multiple-pole switch, is actuated. This applies a control voltage to the magnetic coils 36', 37', 38' of relays 36, 37, 38 so that their contacts are closed, thereby starting the motors 32, 33, 34. At the same time, the control voltage is applied to relay 48 via the switch 47 and to the clock pulse generator relay 20 via relay 37. The contact pieces of clock pulse generator relay 20 alternatively connect the circuits to solenoid valves 17, 17', respectively, so that pushers 5 alternatingly push a blank nut 1 onto the associated thread cutter and then the piston rods 4 are retracted.

The operation of the electrical safety device which, in addition to the above-mentioned circuit elements, includes two auxiliary relays 49 and 50 as well as a push-button operated switch 51 for turning off the entire electrical system, can be seen and readily understood from the circuit diagrams.

In practice, a further push-button operated switch 52 is provided with which only the vibrator associated with the magazine can be switched on even if the machine is otherwise standing still.

The circuit further includes a current measuring device 53 which has two adjustable measuring contacts designed and arranged to sense the increased current consumption of motor 32 if there is an excess load on the motor 32, due, for instance, to dull thread cutters. If the normal current consumption is exceeded only slightly, the device 53 turns on a warning light 54, whereas if the current exceeds a given higher level, the relay 49 energizes a second warning light 55 and switches off the system. A third warning light 56 is automatically switched on if one of the other described malfunctions has occurred so that the operator will be informed of the reason for the automatic disconnection of the system.

In the above-described thread cutter, the clock pulse sequence of the nut advance is determined by a time relay. Thus the rhythm or cyclic rate is independent of the cutting speed of the drill, and it is therefore necessary, for example, when the cutting speed has been increased, to increase the rate by changing the time-delay relay so that the spacing between successive nuts remains the same. It is thus necessary to change the cyclic rate or rhythm after every change in cutting speed.

Figure 7:
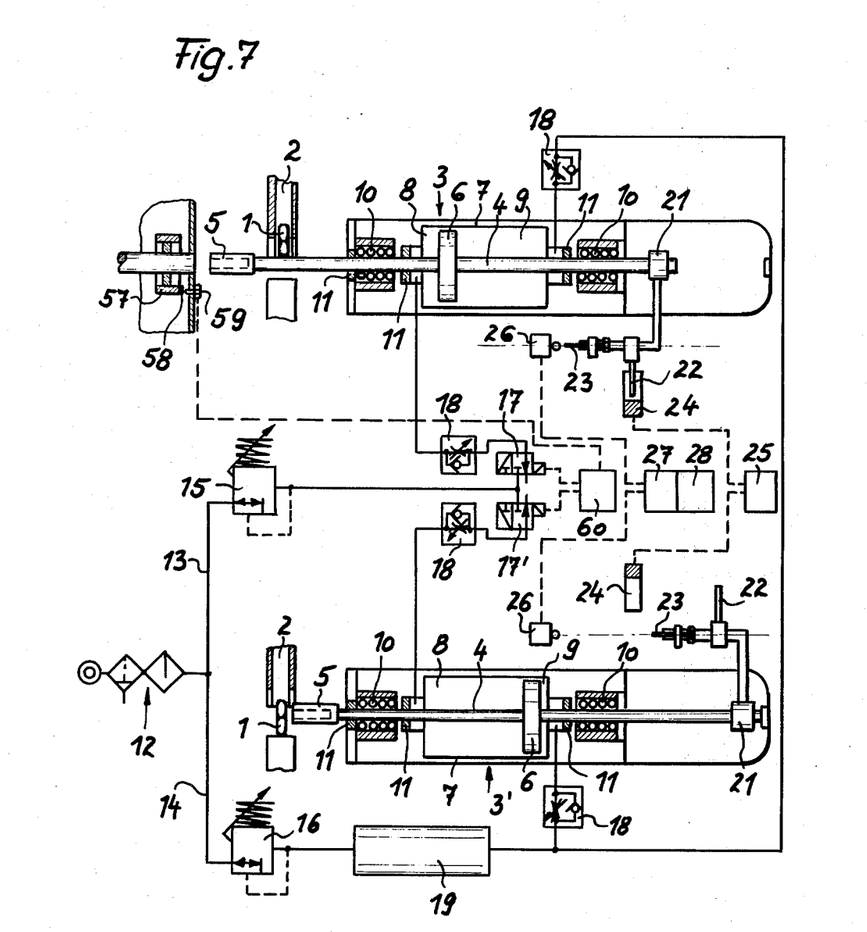
FIG. 7 is a schematic illustration of still another embodiment of a transporting device.
Figure 8:
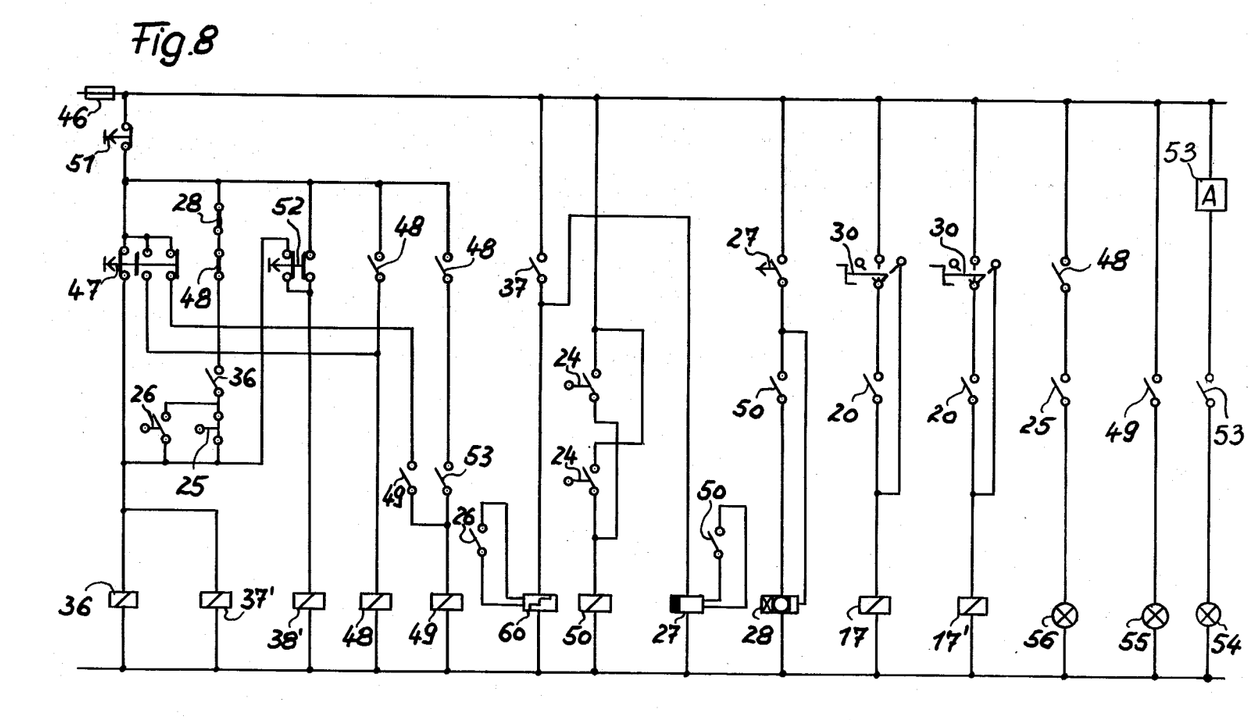
FIG. 8 is a circuit diagram for the transporting device of FIG. 7.

In view of the above, the apparatus shown in FIGS. 7 and 8 allows the ratio of the drill speed to the rate at which the blank nuts are introduced to have a certain preselectable relationship. It can be set, for example, so that after every 25 revolutions of the drilling spindle, a nut is advanced independently of the speed of the thread cutter. The ratio of number of revolutions of the drill to the rate of advance determines the spacing between the nuts going into the drill. With the preselection of the ratio, the nut spacing thus remains constant independent of the selected cutting speed. By changing this ratio, the spacing between successive nuts can be reduced or enlarged as required by the operating conditions. This significantly simplifies the operation of the machine.

The above is accomplished by providing two contactless, inductively-acting switching elements 58 which are arranged on the rotating drive disc 57 for the thread cutter (not shown), these switching elements being offset by 180° with respect to one another and serving to excite a pulse generator 59 attached to the machine housing or frame with every revolution of disc 57. The pulse generator 59 acts on a preselection pulse counter 60. The pulse generator 59 thus emits two pulses to the preselection pulse generator 60 during every revolution of the disc 57.

This pulse counter is used to set the number of pulses to be stored. Once the set number of pulses has been reached, the switch valves receive an instruction via a transducer.

It will be seen from the above that the ratio of spindle revolutions to advance and retraction can be adjusted by means of the pulse counter. If the ratio of spindle revolutions to nut advance is set, for example, at 20:1, the two switching elements 29 will give an instruction for advancing a nut after ten spindle revolutions and after another ten revolutions will give the instruction for retracting the pusher. If a second spindle is used, the instructions for this spindle are used in the reverse order.

The electrical switching elements described above are conventional, are commercially available, and need therefore not be described in detail.

The machine described above eliminates the previously required bulky cam gears and their complicated change gear drives. Likewise eliminated is the time consuming operation of changing gears when the thread cutter is to be changed over from one thread cutting operation to another.

A further advantage of the above-described machine is the possibility of infinitely varying the insertion speed of the nuts while the machine is running. Thus, optimum output can be obtained.

The thread cutting machine according to the invention can also be adapted substantially simpler and faster to the respective operating conditions than heretofore known thread cutters.

It has, moreover, been found that the previously used ways for obtaining a constant advancing movement of the blank nuts do not assure constant relative movement between the advancing blank nuts and the thread cutter because the thread cutter cannot be fixed in axial direction since, inter alia, its bent end more or less elastically bends through under the influence of different cutting pressures and contact pressure so that the steps taken to obtain constant pusher displacement speeds are useless. This, too, is avoided by the thread cutter according to the present invention.

It has also been found that, contrary to prevailing opinion in the art, the quality of the threads can be increased substantially if the thread cutter is pushed rapidly into the core hole of the blank nuts, i.e., the cutting process begins spontaneously, and after cutting of the thread has started, the thread cutter alone transports the nut in axial direction. The thread cutter according to the invention provides the best conditions to achieve this result since it is easy to vary the contact pressure of the pusher on the blank nut so that, in conjunction with the respective most favorable number of revolutions of the thread cutter, the machine achieves optimum efficiency with highest thread quality.

The above-described double-action cylinder and switch valve arrangement which selectively varies the forward stroke as well as the reverse stroke further increases efficiency of the machine. Moreover, the arrangement wherein the piston rod extends beyond the cylinder at both frontal faces and the switching members influence the electrical safety device are mounted at the end of the piston rod which faces away from the pusher constitutes still another improvement because in this way, it is possible to obtain, on the one hand, identically sized displacement chambers in the actuating cylinder and, on the other hand, the space in front of the cylinder is free of switching members and thus more easily accessible, thus allowing easy repair, in case of possible malfunctions in the nut supply lines.

The manually actuated switches which act independently of the electrical pulse control and which provide the selective charge on the actuating cylinder facilitate the operation of the above-described automatic machine, for example when retooling and/or to eliminate malfunctions. For one thing, the pusher can be retrieved merely by actuating a switch, while previously much effort had to be expended in order to crank back the gears manually.

As set forth above, in one of the embodiments of the invention an adjustable pressure relief valve is provided in both conduits leading to the displacement chambers of the actuating cylinder, the valves being adjusted so that it is possible to charge the displacement chambers with mutually different fluid pressures, there being a solenoid valve disposed in the conduit leading to the first displacement chamber of the operating cylinder in which a high pressure can be developed followed by a choke valve, while in the conduit leading to the second displacement chamber, a medium reservoir is provided between the pressure relief valve and the operating cylinder This pressure medium reservoir has a volume which is preferably greater than that of the displacement chamber of the actuating cylinder. The solenoid valve is in the form of a three-way valve which, in the one switching position, opens the conduit leading from the pressure relief valve to the choke valve while in the other position it closes the conduit leading from the pressure relief valve and connects the choke valve with a line leading into the free atmosphere, the arrangement being such that the choke valve chokes in the direction of flow toward the displacement chamber of the actuating cylinder and is unchoked in the opposite direction of flow. In this way, the thread cutting machine combines all of the above-mentioned advantages and is distinguished by a significant reduction in the pressure medium requirement. This is so because only the front displacement chamber has to be ventilated when the displacement direction of the piston rod is to be changed. Nonetheless, the forward stroke as well as the reverse stroke of the piston rod can be infinitely adapted to the respective operating conditions.

As likewise described above, one embodiment of the electrical safety device has two control switches which are spaced in the direction of advance of the piston rod. These control switches are arranged one behind the other and are influenced by the piston rod one after the other during its forward movement so that they can sense the length of advancement of the piston rod and can act on the drive of the thread cutter. The first control switch does not influence the drive of the thread cutter if, within a preselectable period of time, the pusher mounted at the piston rod has reached the position required to push a blank nut onto the thread cutter, while the second control switch emits a pulse which cuts off the drive of the thread cutter after a preselectable number of piston rod displacements beyond the above-mentioned piston rod position. As described above, the first switching finger cooperates with a first electrical control switch which is connected to a delayed cut-off, adjustable time-delay relay which interrupts the main current circuit of the thread cutter after a preselectable period of time if a control pulse from the first control switch to the time-delay relay is absent, while the second switching finger cooperates with a second electrical control switch which acts on a settable time-delay relay which stores a preselectable number of switching pulses, the time-delay relay and the storage relay being designed so that when a preselectable number of switching pulses is exceeded on the part of the second electrical control switch within a preselectable period of time, these relays cause the cutter drive to be switched off. A mount carrying the two switching fingers is axially displaceable at the piston rod and the second switching finger is longitudinally displaceable. Thus, the machine will be automatically switched off if the thread cutter breaks, or if the blank nuts are introduced at an angle or lie in an oblique position, or if they have no holes or off-center holes, or if there are no blank nuts, so that damage to the machine is avoided.

There exists the additional advantage that the machine is not switched off if just one blank nut is missing but only after a preselectable number of piston rod advances.

An above-described feature that the first electrical control switch is an induction switch which operates without contact and that the second electrical control switch is designed as a sensor which can be actuated by the second switching finger in a force locking manner, further simplifies the maintenance of the machine.

Further, the fact that two mutually parallel arranged actuating cylinders are provided, each having its associated blank nut feed trough, a rotationally secure support for the blank nuts as well as a rotating thread cutter, and that an electrical control device is provided which alternatingly influences the cylinders and that the time and storage relays alternatingly act on one or the other cylinders, substantially increases the output of the machine.

Moreover, if, as described above, the conduit leading from a a pressure relief valve of high fluid pressure opens into a T-shaped conduit each of whose outlets is connected to a solenoid valve as well as a series-connected choke valve, and if each choke valve on the other hand is connected with the front displacement chamber of one of the two operating cylinders facing the pusher, the rear displacement chambers of the two operating cylinders are connected together, and if a choke valve is disposed in this connecting conduit in front of each operating cylinder and the connecting conduit is connected to a pressure relief valve for low pressures with a series-connected fluid pressure reservoir, there is obtained an automatic thread cutter with twice the output of prior art cutters without it being necessary to double all of the individual control components.

This automatic machine according to the above-described invention is also distinguished by low pressure medium requirement, and by the fact that it can be as rapidly and easily adapted to the respective operating conditions as can the embodiment with one actuating cylinder.

This arrangement also permits the selective retraction of both pushers, which would not be possible with a machine having cam-controlled pushers.

It will be understood that the above description of the present invention is susceptible to various modifications, changes and adaptations, and the same are intended to be comprehended within the meaning and range of equivalents of the appended claims.

What is claimed is:

1. In an automatic thread cutter for nuts and similar mass-produced parts where the nuts or the like are taken from a magazine and moved through a feed trough into a guide where they are held secured against rotation and are then pushed by means of a pusher over a rotating thread cutter from where they are subsequently removed while the pusher is returned to its starting position, the improvement comprising:
    a. a pressure medium operated double acting actuating cylinder including first and second displacement chambers and a piston separating said chambers and being slidably received therein;
    b. a piston rod affixed to said piston and projecting from said cylinder and carrying said pusher;
    c. a pressure medium supply means including a conduit circuit coupled to said first and second displacement chambers and pressurizing means connected in said conduit circuit for maintaining said pressure medium under pressure;
    d. a solenoid valve connected in said conduit circuit for controlling the admission of the pressure medium into at least one of said displacement chambers, said solenoid valve having an energized state effecting a greater pressure in said first displacement chamber than in said second displacement chamber for displacing said piston, said piston rod and said pusher in a first direction; said solenoid valve having a de-energized state effecting a greater pressure in said second displacement chamber than in said first displacement chamber for displacing said piston, said piston rod and said pusher in a second direction which is opposite said first direction; said pusher performing its work during the course of its movement in one of said directions and performing its return motion to its starting position during the course of its movement in the other of said directions;
    e. electric circuit means connected to said solenoid valve for placing the same alternatingly in said energized and de-energized states, said electric circuit including
        1. a settable pulse generating means for controlling, dependent upon its setting, the length of the alternating energized and de-energized states; and
        2. drive means for driving said thread cutter;
    f. a first electric safety means having
        1. a first control switch formed of a first stationary switching member and a first movable switching member cooperating with said first stationary switching member and attached to said piston rod for moving in unison therewith; said first control switch emitting a first pulse in response to a predetermined position of said first movable switching member relative to said first stationary switching member in the course of travel of said piston rod in its normal, predetermined path;

2. a first settable time-delay relay connected to said first control switch for receiving said first pulse from said first control switch; said first settable time-delay relay being connected to said electric circuit means for applying a second pulse to said electric circuit means solely in the absence of said first pulse within a predetermined period set at said first time-delay relay; said second pulse de-energizing said electric circuit means for switching off said drive means; and g. a second electric safety means having
  1. a second control switch formed of a second stationary switching member and a second movable switching member cooperating with said second stationary switching member and attached to said piston rod for moving in unison therewith; said second control switch emitting a third pulse in response to a predetermined position of said second movable switching member relative to said second stationary switching member in the course of travel of said piston rod beyond its normal predetermined path;
  2. a storage relay operatively connected to said second control switch for receiving and counting third pulses emitted by said second control switch; and
  3. a second settable time-delay relay connected to said storage relay and said electric circuit means for applying a fourth pulse to said electric circuit means solely in the presence of a predetermined count of said third pulses in said storage relay within a predetermined period set at said second time-delay relay; said fourth pulse de-energizing said electric circuit means for switching off said drive means.

2. Automatic thread cutter as defined in claim 1, wherein said settable pulse generating means is a settable clock pulse generating relay.

3. Automatic thread cutter as defined in claim 1, wherein said settable pulse generating means includes
  a. a pulse generator operatively coupled to said drive means for emitting pulses as a function of the rpm of the thread cutter; and
  b. a preselection pulse counter connected to said pulse generator for receiving the pulses from said pulse generator; said preselection pulse counter being operatively connected to said solenoid valve for applying a switching signal to said solenoid valve when a predetermined number of pulses emitted by said pulse generator is received by said preselection pulse counter; said predetermined number being settable at said preselection pulse counter.

4. Automatic thread cutter as defined in claim 1, wherein said piston rod extends beyond said cylinder at its two frontal faces, and wherein said first and second movable switching members are provided at the end of the piston rod facing away from said plunger.

5. Automatic thread cutter as defined in claim 1, further comprising a manually actuatable switch operatively connected to said conduit circuit and being independent of said settable pulse generating means for selectively supplying pressure to said actuating cylinder.

6. Automatic thread cutter as defined in claim 5, wherein said manually actuatable switch is a switch valve provided in a conduit arranged parallel to another conduit containing said solenoid valve.

7. Automatic thread cutter as defined in claim 5, wherein said manually actuatable switch is an electrical switch, arranged in a control line which is connected in parallel with said solenoid valve.

8. Automatic thread cutter as defined in claim 7, wherein a mechanical switch is provided at said solenoid valve for manually and selectively opening the same.

9. Automatic thread cutter as defined in claim 1, further comprising adjustable first and second pressure relief valve means provided in first and second conduits forming part of said conduit circuit and leading, respectively, to said first and second displacement chambers of said actuating cylinder, said two pressure relief valve means set so that said displacement chambers of said actuating cylinder can be charged with mutually different fluid pressures; wherein said solenoid valve is provided in said first conduit between said first pressure relief valve means and said first displacement chamber and following thereafter choke valve means are provided; wherein, in said second conduit a pressure medium reservoir is disposed between said second pressure relief valve means and said second displacement chamber, said pressure medium reservoir having a volume which is greater than that of said second displacement chamber; and wherein said solenoid valve is a three-way valve which in one of said states opens the conduit portion leading from said first pressure relief valve means to said choke valve means, and which in the other of said states closes the conduit portion leading from said first pressure relief valve means and connects said choke valve means with a line venting to atmosphere, said choke valve means acting as a choke in the flow direction toward said first displacement chamber of said actuating cylinder and remains unchoked in the opposite direction of flow.

10. Automatic thread cutter as defined in claim 1, further comprising a mount on said piston rod, said mount carrying said first and second switching members which are arranged one behind the other in the direction of advancement of said piston rod.

11. Automatic thread cutter as defined in claim 10, wherein said mount is axially displaceably fastened to said piston rod.

12. Automatic thread cutter as defined in claim 10, wherein said second switching member, is of variable length.

13. Automatic thread cutter as defined in claim 10, wherein said first control switch is an induction switch which acts without contact and said second control switch comprises a button which is actuated in a force-locking manner by said second switching member.

14. Automatic thread cutter as defined in claim 1, wherein two mutally parallel arranged actuating cylinders are provided, each having associated with it a respective blank nut feed trough, a respective rotationally secured mount for the blank nuts as well as a respective rotating thread cutter, said electric circuit means alternatingly influencing said actuating cylinders, and wherein said time-delay and storage relays are constructed and arranged to become effective alternatingly on the one or the other of said actuating cylinders.

15. Automatic thread cutter as defined in claim 14, further comprising a conduit leading from first pressure relief valve means of high fluid pressure to the inlet of a T-shaped conduit to each of whose outlets a respective solenoid valve is connected followed by a respective choke valve, each choke valve being connected with a front displacement chamber facing the pusher of a respective one of the two actuating cylinders, the rear displacement chambers of both actuating cylinders being connected together, each choke valve being disposed in said connecting conduit in front of each actuating cylinder, said connecting conduit being connected to second pressure relief valve means of low fluid pressure followed by a fluid pressure reservoir.

* * * * *